Patented Aug. 18, 1931

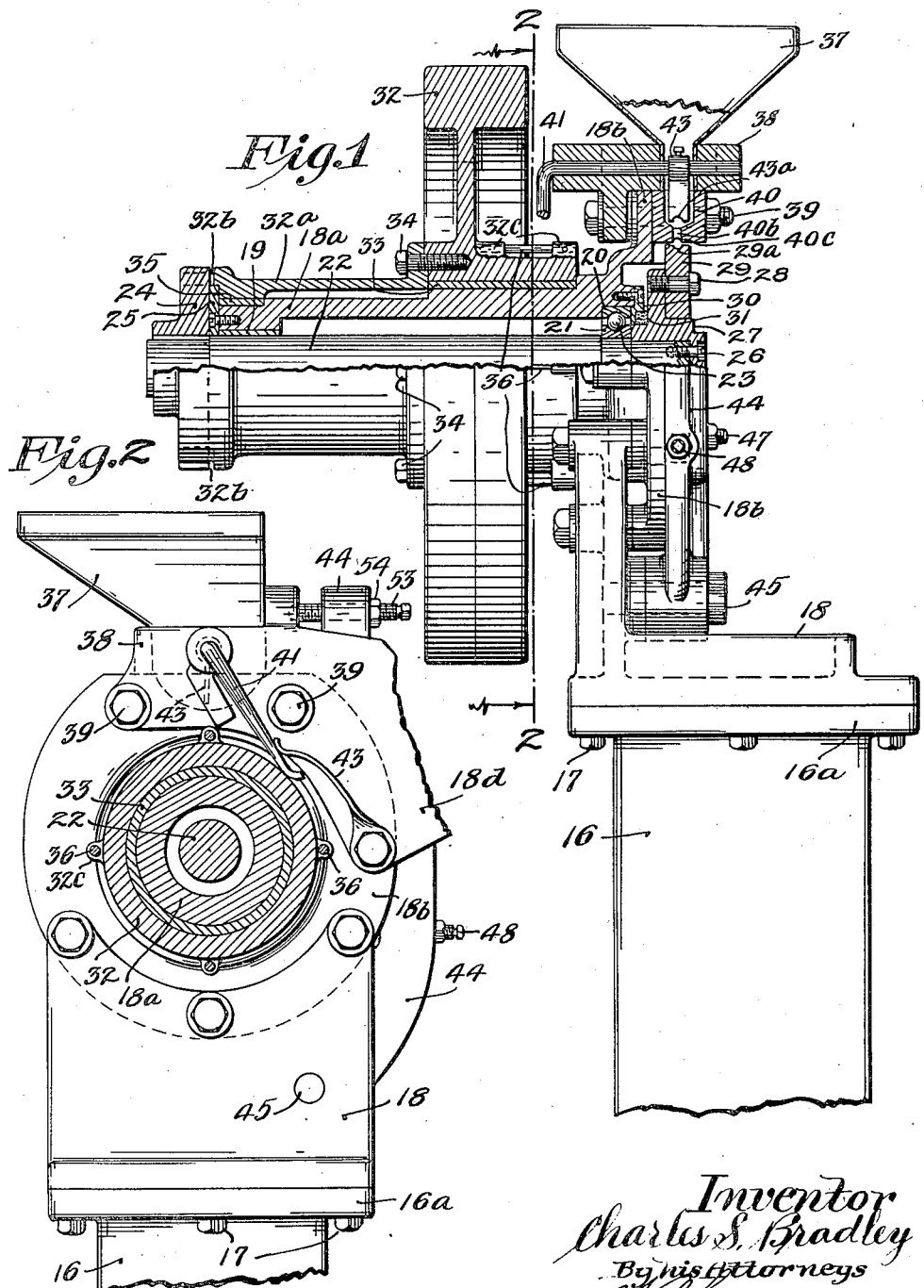

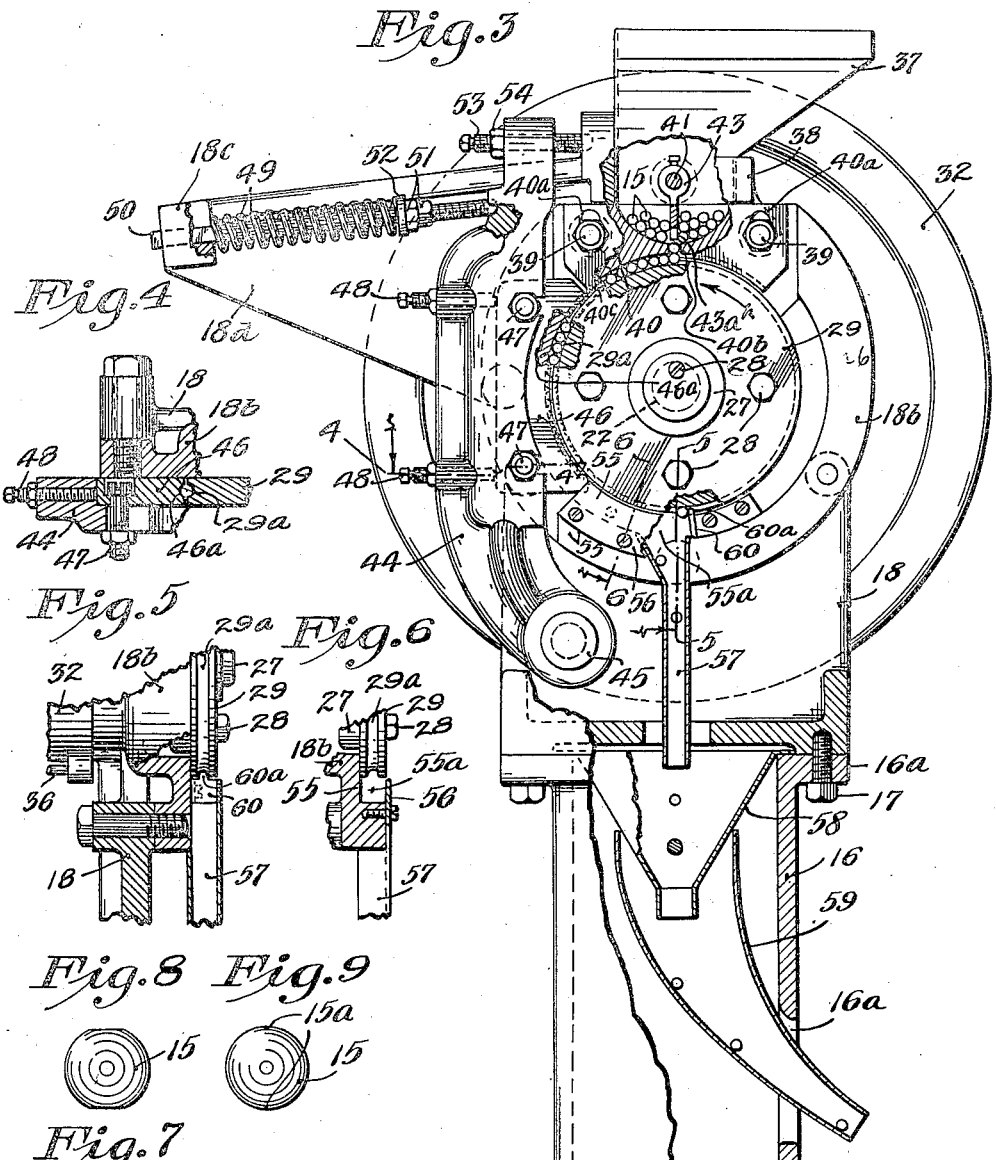

1,819,220

UNITED STATES PATENT OFFICE

CHARLES S. BRADLEY, OF MINNEAPOLIS, MINNESOTA, ASSIGNOR TO AMERICAN BALL COMPANY, OF MINNEAPOLIS, MINNESOTA, A CORPORATION OF MINNESOTA

BALL SHAPING APPARATUS

Application filed October 13, 1927. Serial No. 225,971.

This invention relates to a ball forming apparatus, and while the invention is applicable to many different kinds of balls, it particularly is illustrated and described in connection with balls constituting air rifle shot. Air rifle shot are now commonly made of steel and the balls are preliminarily and roughly formed by dies which cut the same from a rod of stock or steel wire. The balls when leaving the dies are not of true spherical form, but have a roughly spherical form with flattened sides. It is necessary that the finished ball be spherical in shape whether or not the balls are tempered. It has heretofore been proposed to bring the balls to spherical shape by rolling the roughly spherical balls between dies having semi-cylindrical grooves therein. The balls substantially fitted said grooves and owing to the differential action of the sides of the grooves on the balls, portions of the surfaces of the balls would be condensed and said portions would break off into flakes. By this continual flaking or sloughing off of portions of the balls, the same were eventually brought to substantially spherical form. This operation, however, has some objections, and it is difficult to maintain the apparatus for carrying out the same in suitable operative condition.

It is an object of this invention, therefore, to provide an apparatus in which the roughly formed balls are rolled between dies having grooves therein which are substantially but less than semi-circular in cross section but which are developed from a circle having a considerably greater diameter than the diameter of the balls but the bottoms of which grooves are spaced apart to engage said balls at successively different points by the rolling action between said dies whereby said balls are thus brought to substantially spherical form.

It is another object of the invention to provide a simple and efficient form of apparatus by means of which the balls can be very quickly brought to the spherical shape.

These and other objects and advantages of the invention will be fully set forth in the following description made in connection with the accompanying drawings, in which like reference characters refer to similar parts throughout the several views and in which:—

Fig. 1 is a view partly in side elevation and partly in vertical section of an apparatus for carrying out the method of the present invention;

Fig. 2 is a vertical section taken on line 2—2 of Fig. 1 as indicated by the arrows;

Fig. 3 is a view in end elevation of the machine, certain portions being broken away and other portions being shown in vertical section;

Fig. 4 is a partial section taken on line 4—4 of Fig. 3;

Fig. 5 is a partial section taken substantially on line 5—5 of Fig. 3;

Fig. 6 is a partial section taken substantially on line 6—6 of Fig. 3;

Fig. 7 is a radial section between the groove portions of the dies showing the same on an enlarged scale and showing a ball therein;

Fig. 8 is an end view of one of the balls before being treated; and

Fig. 9 is an end view of a completed or rounded ball.

Referring to the drawings, particularly Fig. 8, one of the balls or air rifle shot 15 is shown as the same comes from the forming dies which cut the same from the steel wire or stock. It will be noted that said ball has pronounced flattened portions at opposite sides thereof. The ball in this shape is not suitable for use but must be brought into truly spherical form. According to the present invention, the ball is rolled between dies having slightly less than grooves therein which are substantially but less than semi-circular in cross section and which are developed from a circle having a considerably greater diameter than the diameter of the balls, the bottoms of which grooves are spaced apart less distance than the diameter of the said circle to engage the ball. The rolling of the ball between these dies presses on different portions of the ball and the metal of the ball is worked toward the flattened sides thereof and the ball brought to substantially spherical form. The finished ball may have the merest trace of a spot 15a as shown in Fig. 9, where the flattened side was previously located, but the balls are substantially of spherical shape.

While various forms of the apparatus might be used, one form which has been found very efficient in practice is illustrated in Figs. 1 to 7. Referring to these figures, said apparatus comprises a machine having a hollow base or pedestal 16 which will be secured to the floor or other supporting surface by a suitable means (not shown). Said base 16 has a flange 16a at its upper end to which is bolted by the bolts 17 a head 18. This head has a long laterally extending bearing sleeve 18a projecting at one side thereof and has at the inner end of said sleeve a face plate or flange 18b. The sleeve 18a has a bushing 19 therein at one end and adjacent its other end has a shell 20 of a ball bearing therein, the other member 21 of which ball bearing is secured to a shaft 22 carried in said bearing and bushing 19, one of the balls of said ball bearing being indicated at 23. The shaft 22 has a hub 24 keyed to its outer end, which is provided with a plurality of notches in its periphery for a purpose to be later described. The hub 24 bears against a plate 25 which in turn is secured by spaced headed and countersunk screws to the end of sleeve 18a. The shaft 22 has secured to its front end by the circumferentially spaced screw 26, an annular member 27 having a circular flange to which in turn is secured by the circumferentially spaced screws 28 a die ring 29. This ring has formed therein centrally of its periphery, a groove 29a which is substantially but slightly less than semi-circular in cross section but which is developed from a circle having a considerably greater diameter than the ball to be formed. An annular plate 30 is secured to the front end of the sleeve 18a engaging and holding in place the ball bearing members 20 and 21, and between which and the member 27 a washer 31 of felt or similar material is disposed, to exclude dirt and dust from said ball bearing.

A pulley 32 formed as a fly-wheel is provided, which runs on a bushing 33 surrounding the inner portion of the sleeve 18a, said pulley having a projecting hub 32a secured thereto by the bolts 34, which hub runs on the bushing 35 surrounding the outer end of sleeve 18a and has projecting lugs 32b entering the notches or recesses in the periphery of hub 24 to drive the latter. The pulley 32 also has at one side of its hub circumferentially spaced pairs of alined lugs 32c which are bored to receive and have extending therebetween spaced rods 36.

A hopper 37 is provided, carried in an aperture formed in the bracket 38, which bracket is secured to lugs flange 18b by the spaced headed and nutted bolts 39. A block 40 is also secured to flange 18b by the bolts 39, which block has slots 40a therein, through which said bolts pass, whereby said block may be adjusted to different positions. The block 40 has an arcuate recess therein forming a continuation of the opening in the hopper, and the unfinished balls 15 are disposed in this recess and the hopper. A shaft 41 is journaled in bracket 38, extending through the hopper 37, and has secured thereto centrally of said hopper a feed arm 43. This arm is of flat formation and has in its lower edge a semi-circular notch 43a. Said arm 43 extends into the recess in block 40 and said block has an opening 40b at its center for the passage of single balls 15. The block 40 has a groove 40c therein extending from the opening 40b and which is substantially but less than semi-circular in cross section but which is developed from a circle having a considerably greater diameter than the balls to be formed, said groove being disposed reversely to and mating with the groove in said die plate. The grooves 20a and 20c have their bottoms spaced apart less distance than the diameter of a circle from which the grooves are developed. The shaft 41 is bent at right angle at its inner end and tapered, the same having a curved terminal, and said end being arranged to contact the hub of pulley 32 and be engaged by the rods 36. A spring 43 is secured to bracket 38 by one of the bolts 39 and has its end engaging the end of rod 41 so that the same is moved back in engagement with the hub of pulley 32 after being raised by the rods 36. An arm 44 is pivoted to the frame 18 by a headed stud 45. The arm 44 is recessed to receive an arcuate die member 46 having groove 46a therein which is substantially but less than semi-circular in cross section but which is developed from a circle having a considerably greater diameter than the balls to be formed, said groove being disposed reversely to and mating with the groove in member 29, said die extending in close proximity to the edge of block 40. Said die is held in arm 44 by the headed and nutted bolts 47 and may be adjustably secured therein, arm 44 having slots for the reception of said bolts. The die is accurately adjusted by set screws 48 which extend through arm 44 and engage the rear side of said die so that the bottoms of the two grooves 29a and 46a are spaced slightly less distance apart than the diameter of the circle from which the gooves are developed. The arm 44 is yieldingly held in position by a compression coil spring 49 which surrounds a rod 50 extending through a boss 18c carried on the end of a heavy arm 18b formed integral with the head 18. The rod 50 loosely engages the arm 44 at one end and is threaded adjacent said end to receive a pair of nuts 51 engaging the washer 52 with which one end of spring 49 engages, the other end of said spring engaging the lug 18c. It will thus be seen that the tension of spring 49 can be varied. The position of arm 44 is determined and adjustably limited by a set screw 53 extending through the upper end thereof and engaging a portion of the arm 18d, said set screw having a jamb nut 54 thereon engaging arm 44. A member 55 is secured to flange 18b below and adjacent die plate 46. This member 55 has an arcuate side adjacent and parallel to the periphery of member 29 and has rabbeted portions 55a therein. A plate 56 is secured to the side of member 55 and forms with the portion 55a a trough into which the balls pass from the die 46. A discharge spout 57 is provided and has a flared upper end projecting into member 55 so as to receive the balls therefrom. Said spout extends downward through an aperture in the head 18 and alines with a hopper 58 supported on the top flange of pedestal 16, which hopper in turn discharges into a spout 59 which is curved to extend through an aperture 16a in the side of pedestal 16 from which spout the balls are discharged into some suitable receptacle. A small plate 60 is secured to the side of flange 18b adjacent one edge of spout 57, which plate has a tongue 60a projecting into the groove of die member 29. It will be noted that the flange 18b extends around the side of die plate 29.

In carrying out the operation of the apparatus described, the unfinished balls such as shown in Fig. 8 are placed in the hopper 37. These balls as shown in Fig. 3 pass down into the recess in block 40. The machine is driven by a suitable belt running over the fly wheel pulley 32 so that shaft 22 and die 29 are rotated in the direction indicated by the arrow in Fig. 3. The shaft 41 is oscillated by the rods 36 engaging the end of its arm so that the feed arm 43 is oscillated back and forth over the opening 40b in block 40. The balls 15 are thus kept agitated and fed singly through said opening between the die plate 29 and the groove in block 40. The semi-circular notch 43a in the feed arm prevents any jamming of the balls. As the balls pass between die 29 and block 40, they are rolled in the grooves formed in said members and then pass into the grooves in the stationary die 46. As above stated, the grooves are substantially but less than semi-circular in cross section and are developed from a circle having a considerably greater diameter than the diameter of the balls but the bottoms of which grooves are spaced apart less distance than the diameter of the said circle. The balls are then rolled between the dies and the dies are so adjusted that pressure is exerted on the balls. As the balls turn in the grooves, they are pressed at various portions and the metal thereof is worked over the flattened portion. The balls are thus brought to substantially spherical shape before reaching the end of die 46. If the balls are not sufficiently spherical after passing once through the machine, they will be passed through again. In practice the balls pass through the machine about three times. The action of the dies on the balls is a pressing action which gradually works the metal over the flattened sides so that the balls have substantially a spherical shape. As above stated, there is sometimes merely a dot appearing on the sides of the balls where the flattened surface had previously been. After the balls have passed the die 46, they pass into the spout 57 and are discharged through hopper 58 and discharge spout 59. As above stated, the position of the die 46 can be accurately adjusted by the screws 48 and the tension on said die can be varied by adjustment of spring 49.

From the above description it is seen that applicant has provided an improved apparatus for truing steel balls, particularly air rifle shot. The balls are repeatedly acted upon and brought to the desired shape. The apparatus has been amply demonstrated in actual practice and found to be very successful and efficient.

It will, of course, be understood that various changes may be made in the form, details, arrangement and proportions of the apparatus and in the steps and sequence of steps of the operation without departing from the scope of applicant's invention, which generally stated, consists in apparatus capable of carrying out the objects above set forth, such as disclosed and defined in the appended claims.

What is claimed is:—

1. An apparatus for truing balls or spheroids comprising, a pair of relatively rotatable dies between which said balls are passed, said dies having oppositely disposed arcuate mating grooves for receiving the balls, said grooves in cross section being of arcuate shape and of less area than a semi-circle and spaced less distance apart than the diameter of the circles on which the grooves are formed.

2. An apparatus for truing metal balls which comprises a pair of relatively rotatable dies between which the balls are passed, which dies have mating grooves receiving the balls, said grooves being slightly less than semi-circular in cross section and being of considerably greater diameter than the diameter of said balls and the bottoms of said grooves being spaced apart less distance than the diameter of the grooves, the central planes of said grooves being coincident, whereby said balls are rolled into substantially spherical form.

3. An apparatus for truing metal balls having in combination a stationary die having an arcuate face with a groove therein slightly less than semi-circular in cross section, a rotating die having its periphery extending closely adjacent but spaced somewhat from said face and also having a groove therein, reversely disposed to said first mentioned groove and slightly less than semi-circular in cross section, the centers of said grooves being constantly in one plane, the bottoms of said grooves being spaced less distance apart than the diameter of said grooves, whereby balls may be received within said grooves, the grooves having diameters of appreciably greater size than the diameter of balls to be received therein.

4. An apparatus for truing metal balls having in combination a stationary die having an arcuate face with a groove therein, slightly less than semi-circular in cross section, a rotating die having its periphery extending closely adjacent but spaced from said face and also having a groove therein slightly less than semi-circular in cross section and reversely disposed in relation to said first mentioned groove so as to form therewith a channel, the bottoms of said grooves being spaced apart slightly less distance than the diameters of said grooves, said channel receiving the balls and said grooves having their diameters appreciably greater than the diameter of said balls, said dies being mounted in rigid relation laterally with said grooves centrally alined.

5. An apparatus for truing metal balls having in combination a stationary die, having an arcuate face with a groove slightly less than semi-circular in cross section therein, a rotating die having a cylindrical periphery and having a face extending closely adjacent and parallel to said first mentioned face, said rotating die having a groove therein reversely disposed to said first mentioned groove, and slightly less than semi-circular in cross section, to form, with said first mentioned groove, a channel having its axial plane at right angles to the axis of said rotating die, the central planes of said grooves being coincident and the bottoms of said grooves being spaced apart less distance than the diameter of the grooves and the diameter of the grooves being appreciably greater than the diameter of said balls, means for feeding unfinished balls singly to said channel and means for discharging said balls from said dies.

In testimony whereof I affix my signature.

CHARLES S. BRADLEY.